(12) United States Patent
Balint

(10) Patent No.: US 10,928,906 B2
(45) Date of Patent: Feb. 23, 2021

(54) DATA ENTRY DEVICE FOR ENTERING CHARACTERS BY A FINGER WITH HAPTIC FEEDBACK

(71) Applicant: Geza Balint, Dunavarsany (HU)

(72) Inventor: Geza Balint, Dunavarsany (HU)

( * ) Notice: Subject to any disclaimer, the term of this patent is extended or adjusted under 35 U.S.C. 154(b) by 0 days.

(21) Appl. No.: 15/772,895

(22) PCT Filed: Nov. 4, 2016

(86) PCT No.: PCT/HU2016/050053
§ 371 (c)(1),
(2) Date: May 2, 2018

(87) PCT Pub. No.: WO2017/077353
PCT Pub. Date: May 11, 2017

(65) Prior Publication Data
US 2018/0321750 A1 Nov. 8, 2018

Related U.S. Application Data

(63) Continuation-in-part of application No. PCT/HU2015/050016, filed on Nov. 5, 2015.

(51) Int. Cl.
| | |
|---|---|
| *G06F 3/01* | (2006.01) |
| *G06F 3/023* | (2006.01) |
| *G06F 3/0354* | (2013.01) |
| *G06F 3/02* | (2006.01) |

(Continued)

(52) U.S. Cl.
CPC .............. *G06F 3/016* (2013.01); *G06F 3/017* (2013.01); *G06F 3/0213* (2013.01);
(Continued)

(58) Field of Classification Search
CPC .. G06F 3/016; G06F 3/03547; G06F 3/03544; G06F 3/04883; G06F 3/0233
See application file for complete search history.

(56) References Cited

U.S. PATENT DOCUMENTS

| | | | | |
|---|---|---|---|---|
| 2002/0101441 A1* | 8/2002 | SanGiovanni | ........ | G06F 3/0233 715/702 |
| 2009/0153374 A1* | 6/2009 | Maw | ..................... | G06F 3/0238 341/27 |

(Continued)

*Primary Examiner* — Shaheda A Abdin
(74) *Attorney, Agent, or Firm* — Handal & Morofsky LLC; Anthony H. Handal; Izick Vizel

(57) ABSTRACT

A data entry device for entering predetermined characters by the finger of a user and converting the characters into a sequence of electronic signals representing the entered characters, that comprises a touch sensitive zone (2) on an outer surface, a processor (58) coupled to the touch sensitive zone (2) for sensing the zone (2) is touched, the processor (58) is programmed to recognize predetermined elementary finger movements and combinations thereof and to associate each of them with a character, wherein a closed boundary (10) is defined on the surface of the device above a portion of the touch sensitive zone (2) that has at least one haptic property differing from the haptic properties of the surrounding area, whereby the finger can definitely sense when the boundary (10) is touched, and the boundary (10) has an interior area constituting a data entry field (11) that has a centre region (16) which has at least one haptic property differing from the haptic properties of the portion beyond the centre region (16), whereby the finger when touching the centre zone (16) can sense being on the centre region (16), and the processor (58) is programmed so as to recognize when the centre region (16) is touched for a predetermined duration by the finger and interprets this event as the beginning of the entry of a character and from that moment starts observing and analyzing the combination of the elementary finger movements as long as the finger touches the data entry field (11), and when the finger has finished touching the data entry field (11) this is interpreted by the processor (58) as the end of the entry of the character, wherein the elementary finger movements can be radial movements between the centre zone (16) and one of a plurality of predetermined discrete special (Continued)

positions along the boundary (10) in both directions and arced movements along the boundary (10) from one special position to a neighbouring special position.

7 Claims, 6 Drawing Sheets

(51) Int. Cl.
*G06F 3/038* (2013.01)
*G06F 3/0488* (2013.01)
*G06F 3/0346* (2013.01)

(52) U.S. Cl.
CPC .......... *G06F 3/0231* (2013.01); *G06F 3/0233* (2013.01); *G06F 3/038* (2013.01); *G06F 3/0346* (2013.01); *G06F 3/0354* (2013.01); *G06F 3/03544* (2013.01); *G06F 3/03547* (2013.01); *G06F 3/0488* (2013.01); *G06F 3/04883* (2013.01)

(56) References Cited

U.S. PATENT DOCUMENTS

| | | | | |
|---|---|---|---|---|
| 2009/0179869 A1* | 7/2009 | Slotznick | ............... | G06F 3/0202 345/173 |
| 2009/0195510 A1* | 8/2009 | Saunders | ............ | G06F 3/03547 345/169 |
| 2011/0285651 A1* | 11/2011 | Temple | ............... | G06F 3/04883 345/173 |
| 2014/0098038 A1* | 4/2014 | Paek | ..................... | G06F 1/1692 345/173 |

* cited by examiner

DATA ENTRY DEVICE FOR ENTERING CHARACTERS BY A FINGER WITH HAPTIC FEEDBACK

The invention relates to a data entry device for entering predetermined characters by a finger or a stylus of a user and converting the characters into a sequence of electronic signals representing the entered characters. The device comprises a touch sensitive zone on an outer surface thereof that can be touched by a finger of the user, a processor coupled to the touch sensitive zone for sensing when the touch sensitive zone is touched and interpreting the electronic signals generated by the touch sensitive zone. The processor is programmed to recognize predetermined elementary finger movements and predetermined combinations of these elementary movements and to associate each of the predetermined combinations with a character, and after having sensed the entry of a predetermined combination to deliver the electronic signals of the character associated with the recognized combination.

In the present specification the term 'character' is used in the sense as an entered piece of data, that can be a letter, a number, a punctuation mark or even a function. Furthermore, the term "finger" is not limited to the finger of the user but it covers a stylus or pen which the user uses to enter data. Furthermore the user can equally be male or female, but for the sake of simplicity the male version will be used that does not exclude use by females.

In the most simple approach the invention relates to a device for use of converting elementary finger or thumb movements and/or movement combinations into respective characters and/or functions presented in the form of electrical signals, wherein a haptic feedback is used that facilitates data entry by the user.

A large number of different data entry methods and devices are known which can be divided into several groups according to their basic principle of operation. According to the first and perhaps more generally used type characters are directly entered by using a keyboard provided with a predetermined number of keys associated with the respective characters or functions, and the pushing of a key generates data corresponding to the character or function associated with that key. The number of the keys is generally less than the number of the required characters/functions/commands that should be defined, therefore most keyboards comprise function keys or certain functions can be activated with specific key combinations. The size of the keyboards fits to the size of human hands and fingers, thus their use is preferred from ergonomic aspects. It is their drawback, however, that they could not follow the tendency of miniaturization of electronic devices, and with decreased sizes their use is limited or it is uncomfortable.

In telephones of older mobile phones number and three functions keys are arranged in three columns and 5 rows, and such key-arrangement is referred to as ITU-T key arrangement. Letters can be typed by pressing a number key several times in sequence and in such keyboards under each number the three associated letters are shown. Entering characters and writing longer texts with such ITU-T characters is tiring and lengthy, they might be good for short messages but not for writing.

In several ones of recent electronic devices, primarily in mobile phones and tablets, especially which are equipped with a touch screen a virtual keyboard is displayed when there is a need for data entry, and the actual data entry occurs similar to conventional keyboards by selection among the displayed keys represented by respective fields, in which the selected key should be touched by a finger or a pen. One drawback of such electronic keyboards lies in that in use a part of the valuable screen surface is occupied by the virtual keyboard. A further drawback is that if the area available for the keyboard is small, the finding of the fields associated with the respective keys will become more difficult that increases the likelihood of entry errors and increases also the time required for selecting a key, and it is at the same time uncomfortable, especially if the task is the writing of longer texts. The use of a special pen could only partially reduce these problems, since their tips take much smaller area than fingers. The human eyes get soon tired if they have to watch smaller areas and have to choose between the displayed miniature characters.

A further group of data entry devices utilize the principle of selection and utilizes the function of a mouse, namely the characters are not directly entered as in case of the first group, but the user watches a screen in which multiple characters are displayed, and selects the required one by pointing to the associated field and clicking then with the mouse. This method has the drawback that the plurality of possible choices has to be displayed on a screen and the choice must be made among them. The display takes a part of the valuable display field, and the choice between several fields gets more time consuming and tiring when the number of displayed fields increases. Character entry with a mouse and with such selection is preferred only in case of shorter messages. A further issue lies in that a mouse can be used in a convenient and comfortable way only if its size fits to the size of the hand, and there is an available plane surface along which the mouse can be moved. Miniature devices are known that can be moved in a plane along two coordinates and the movement is followed by a cursor or a marking on a screen, and the selection occurs by pushing the device normal to the plane of movement. Such a device is described e.g. in EP0422361 B1.

Data entry by selections that is similar to the function of the mouse can be found in most remote controllers of electronic entertainment devices, in which four arrows are placed on the device each is associated with a respective direction, by which the required one of the displayed fields can be reached in a stepwise manner, and the selection requires pushing of an OK button. In spite of their wide commercial use, such entry devices are slow and not comfortable furthermore the data entry required for internet use is also slow, discomfortable and tiring. Their application can be justifiable only if they have to be used infrequently and choosing between few characters/functions.

A third group of data entry devices also uses direct data entry, in which the user writes the text with normal handwriting by a pen on a touch screen, and certain simplified versions are also known in which the most frequently used characters or commands can be selected by simple gestures. In such devices the screen takes the function of a "blank paper", and it has the drawback that it takes all or a major part of the available display area, whereas the writing of the characters in a small area is not really efficient, finally the recognition of hand writing is not perfect and errors often occur.

In the publication WO2010/149225 an improved data entry method is disclosed which can be regarded as an improvement of the ITU-T keyboard, wherein instead of pressing the respective keys, a virtual ITU-T keyboard was reproduced on an area comprising an arrangement of touch-sensitive fields and isles between them which are not touch sensitive. The document suggested the movement of a finger or of a stylus along the area according to preset rules, and a processor observed subsequent activation of the touch sensitive fields and compared the sensed combinations with a pre-stored table of characters associated with respective possible combinations. The association of the elementary finger movements or gestures how the respective touch sensitive segmented areas had to be touched with the respective characters-function followed in a simplified sense the shape of the respective characters. The user had to learn to write in this way. When using this method the user was relieved from the need of pressing the same key several times as it was the case at ITU-T keyboards. In order to make the distinction between active and passive fields easier the height of active and passive fields were different therefore when the user moved his finger according to the required pattern, whereby in this way a haptic feedback assisted his orientation. This method was an improvement of several other similar attempts published e.g. in US2004070569, US2005088415 and US20090135142.

Although making gestures is easier than pressing targeted fields, the suggested way of using gestures has drawbacks, as the gestures follow the arrangement of the ITU-T keys, and the presence of an array of touch sensitive (active) and inactive fields is difficult to make and their signals to process, the size of such fields cannot be decreased to a certain minimum, otherwise it would be difficult to find them, therefore a rather large surface area is required for using this data entry system. Finally, the haptic feedback does not provide orientation for the user concerning the actual position of the finger in the array it only signals the boundaries of the active and inactive fields.

The primary object of the invention is to provide a data entry device of the direct data entry type i.e. by which the required characters or functions can be entered in a direct way (i.e. not by using any selection) that does not require separate active and inactive fields and which needs only a small manipulation area and in which the haptic feedback always provides information on the position of the finger in the manipulation area that renders using the combination of different characters.

For solving this object I have recognized that one can easily hold a flat object placed between the thumb and the forefinger or between the thumb and the other fingers, furthermore if the thumb or the forefinger is moved within a small region according to a previously learned and exercised coded system of combination of elementary movements, then by using conventional sensors that convert finger movements into electrical signals, a direct data entry can be provided. The term "finger" used in the present specification covers also the thumb. The learning of the movement combinations and the actual use of the combinations is facilitated and entry errors are minimized if an appropriate haptic feedback is associated with the finger movements, more particularly when the finger reaches respective special locations. In this way a very sensitive and easy to handle data entry method is obtained that is not tiring for the user owing to the need of small movements only. Fingers are very sensitive to sense even the slightest touch, therefore if the special locations of the haptic feedback are chosen in an appropriate way, then the use of character and data entry will be easy to learn and practice.

If the number of the required characters/functions increases over the number of the movement or gesture combinations that can be learned easily, then special gestures or separate designed areas on the surface of the device can be assigned to take the role of one or more function keys, by which a different code system can be assigned to the previously learned movement combinations. This is similar when we press in a conventional keyboard a function key and the characters will be replaced by numbers and commands, or a shift key changes between characters with lower or upper case.

A data entry device designed in the aforementioned way makes use of the fine nature of the haptic or touch sensation and fine movement of the fingers and creates thereby a new paradigm system that have yet unforeseeable data entry and utilization perspectives.

A drawback of this solution lies in, as it is the case in all systems utilizing a new paradigm that one has to depart from conventional ways and has to learn something new, in the present case the gesture combinations. This is facilitated if the respective characters are associated with such combinations in a logical way, i.e. a character is associated with movement combinations that resemble writing the same character but in a greatly simplified manner. Furthermore when new paradigms with new tasks appear, one has to weigh the ratio of the associated advantages/drawbacks connected with learning the new system, and if the advantages outweigh the difficulties, it will be worthwhile to learn it.

As an analogy let us refer to shorthand writing. Before the wide use of smart electronic devices i.e. in the period when typewriting was the dominant way of writing, instead of the slow typewriting that also required a hard physical effort, shorthand writing was invented, learned and widely used. Shorthand writing also utilized the writing of simplified and cleverly abbreviated versions of characters and frequently used expressions, i.e. shorthand writing when expressed with a modern terminology is not else than a smart code system of gestures. To learn shorthand writing was a task that required a substantially higher human effort and learning than the suggested system, and in spite of such difficulties, through several decades millions of people learned and used it, and a few applications of shorthand writing is still in use.

For learning and using a kind of non-conventional combinations a further example can be mentioned, i.e. the Morse codes which have been in use since the beginning of telegraphy and which have been widely learned and used, although that job has been much more difficult than the use of the suggested gesture combinations.

As a further example reference can be made to Braille writing which is also a system that is more difficult to learn than the suggested gesture combinations, and in spite of its difficulty it is widely used.

The learning of the suggested gesture combinations is connected with a further advantage, namely blind and partially sighted subjects can learn it fast and easily, therefore such a data entry device will be appropriate also for their use.

According to a further recognition following the "writing" of the respective characters with a gesture combination and prior to the entry of the next character it is sufficient if the thumb or finger is slightly raised or the pressure is decreased, then the entry of the next character can be started. The validation of the entered characters by raising the finger is a substantial step forward compared to the previously referred conventional ways that copy the function of the mouse because it is much easier and less tiring to decrease pressure than the clicking or pushing of the device. A further advantage lies in that the clicking or pressing as a possible function will be available for additional uses independent from the entry of the characters, by which e.g. a command can be validated or a message displayed on the screen can be accepted.

The direct data entry by the use of elementary movement combinations takes place without any moving element and it is only the finger or stylus of the user which is moved along a special surface region on the upper surface of the device assigned to data entry, and in this region special projections and/or recesses are formed at predetermined special positions that provide haptic feedback for the finger when touched, and the movement of the finger is sensed and converted into electric signals by touch sensors.

A further object of the invention is to utilize the device to provide the best service for the user. In most of the cases data entry tasks occur in combination with other tasks, i.e. when a host equipment like a television set of a set top box or a projector should be controlled from a remote location, the user has to enter data but he has also the task of controlling the movement of the cursor on the remote screen, especially if he surfs of the web by a remote controller.

Because the device has to fit in the palm of the user, and state-of-the art electronic components are small, the same device can be utilized also as an air mouse or even as a mouse if a flat plane surface is available.

Therefore further objects of the invention are to make the device more user-friendly and enable it for performing multiple functions.

The invention is summarized in more detail in the attached claims.

The data entry device according to the invention will now be described in connection with examples in which reference will be made to the accompanying drawings. In the drawing.

Figure 1:
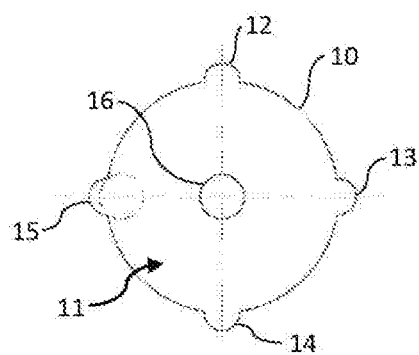
FIG. 1 shows a simplified top view of a data entry field and its characteristic parts.

FIGS. 1 to 4 show exemplary data entry fields defined over respective touch sensitive areas on a stationary surface of a data entry device 1 limited by respective closed curved boundaries. In FIG. 1 a circular boundary 10 is shown and the interior of the boundary 10 represents an associated data entry field 11. At end regions of the vertical and horizontal diameters of the circular boundary 10 respective curved recesses 12, 13, 14 and 15 are provided. In the middle of the data entry field 11 a centre region 16 is shown by a smaller circle.

Figure 2:
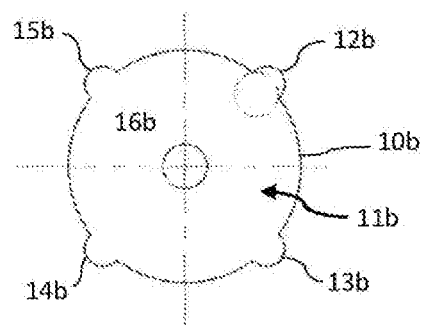
FIG. 2 is similar to FIG. 1 but the recesses are angularly displaced by 45°.

FIG. 2 differs from FIG. 1 in that recesses 12b-15b are formed at the end of two mutually normal diameters of boundary 10b shifted by 45° from the position shown in FIG. 1. This arrangement might be useful if the shape of the device 1 renders the movement of the thumb of the user more comfortable at the indicted orientation. The data entry field 11b is the same as in FIG. 1 and so is the centre region 16b.

Figure 3:
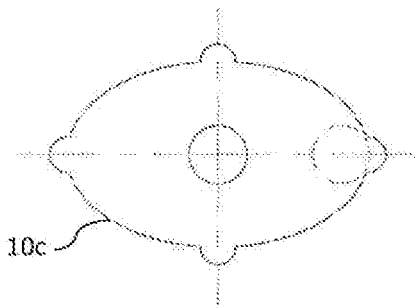
FIGS. 3 and 4 are similar to FIGS. 1 and 2 but the boundary is an ellipse.
Figure 4:
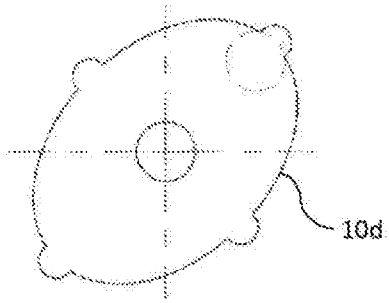

The boundary of the data entry field need not be circular, and the examples in FIGS. 3 and 4 show elliptical boundaries 10c and 10d respectively, wherein the ellipse is turned by 45° in the embodiment shown in FIG. 4 compared to that shown in FIG. 3. The recesses at the end of the diagonals can be found in these embodiments as well.

Figure 5:
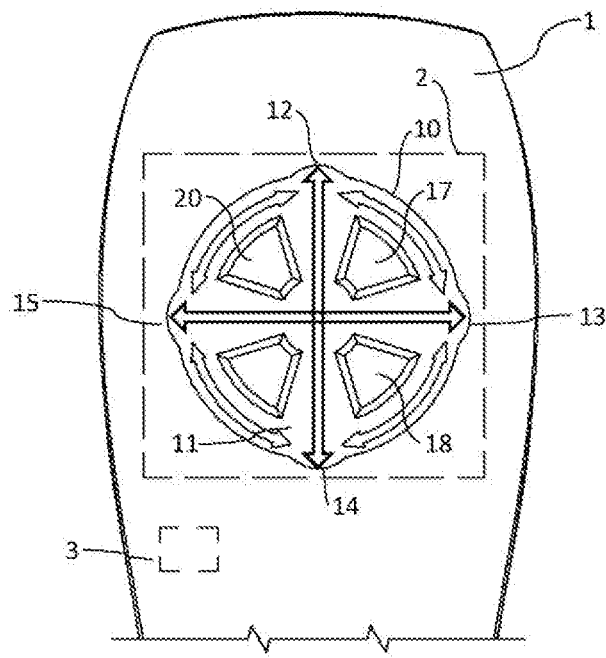
FIG. 5 shows the top view of an enlarged detail of an embodiment of the data entry device.

FIG. 5 shows a preferred embodiment having the same basic configuration as shown in FIG. 1 which is built on a top surface of the hand held data entry device 1 that has the shape of a small remote controller, i.e. it can be held in a hand so that either the thumb or the forefinger of the user can easily reach all points of the data entry field 11. FIG. 5 shows only a portion of the device 1. A more detailed description of the device 1 will be provided in connection with FIGS. 8 to ??. Close under the surface of the device 1 a touch sensitive zone 2 is provided in the body of the device 1 indicated by hashed line, which zone 2 is preferably greater than the data entry field 11 within the circular boundary 10. The data entry device 1 may have different function buttons or zones away from the touch sensitive zone of which FIG. 5 shows only a single control field 3.

For providing a haptic feedback for the user when he moves his finger in the data entry field 11 a sensation should be provided at least when the finger reaches the boundary 10, and when it is on the centre region 16. Preferably further haptic feedback should be provided when the finger reaches the special regions indicated in FIGS. 1 to 5 by the recesses 12 to 15 at the ends of the associated diameters. The haptic sensation can be ensured in several ways of which FIG. 5 shows a plausible example. Here the data entry field 11 lies deeper than the surface of the data entry device 1 away from the circular boundary 10. In FIG. 5 four isles 17, 18, 19 and 20 are defined in the data entry field 11, which are higher than the adjacent areas of the date entry field 11. The inner and outer boundaries of each of the isles 17 to 20 are preferably respective circular arc sections extending concentrically with the boundary 10. The sides of the isles 17 to 20 extend in radial direction. The centre region 16 can be sensed by a user when he feels all the four isles around the finger. Between the sides of the isles 17 to 20 diagonal channels are formed and between the outer arced sides of the isles 17 to 20 and the boundary 10 respective arced channels are formed. These channels are indicated by the empty arrows in FIG. 5. When the user places his finger on the data entry field 11, he can feel when the finger touches the centre region 16 because then he feels all the four isles 17 to 20 around and without the need of looking at the data entry field 11 he can locate the centre region 16 which is normally a starting position for data entry.

The user can move his finger from the centre region 16 along the four diagonal channels, and he feels when during such a radial finger movement the finger reaches the boundary 10. The presence of the recesses at the ends of the respective channels the presence of the recesses 12 to 15 assist the user in sensing that the boundary 10 has been reached. From this position the finger can be moved in either direction along one of the neighbouring arced channels till the next diagonal point is reached where he feels the presence of the recess, and can continue movement either along the next arced channel or return to the centre 16 along the diagonal channel at the recess sensed. After a short experience a user can sense along which one of the available diagonal channels he wants to start entering a character from the centre region 16, as the holding of the device 1 provides him sufficient orientation which direction is up, down left and right. Furthermore he can also feel and determine whether he wishes to move his finger in a clockwise or counter clockwise direction from any one of the recesses. The only job he has to do for entering a character is to learn what elementary movement combinations are associated with the respective characters. This is a quite simple job because the entry of any character includes combination of one or more elementary finger movements that are either radial or guided circular movements along paths with previously learned and during the movement actively sensed, therefore for entering a character he has to move the finger along the previously learned combination of elementary movements, and for doing that he does not have to take a look at the data entry field 11.

It is preferred If the entry of a character starts when the finger is placed on the centre region 16 and the user has to move his finger along the predetermined combination of elementary movements associated with the character to be entered, and the end of entering the character he has to raise his finger from the data entry field 11. After the entry operation is finished a processor connected with the touch sensitive zone 2 can associate the combination of elementary movements sensed with a pre-stored table of combinations which are associated with the respective characters. When the character has been selected in this way, the processor can send it to a display or to a remote host device. According to a preferred embodiment the entry of a character will start more definitely if the user has to slightly press first the centre region 16 before the drawing of the gesture combination.

Figure 6:
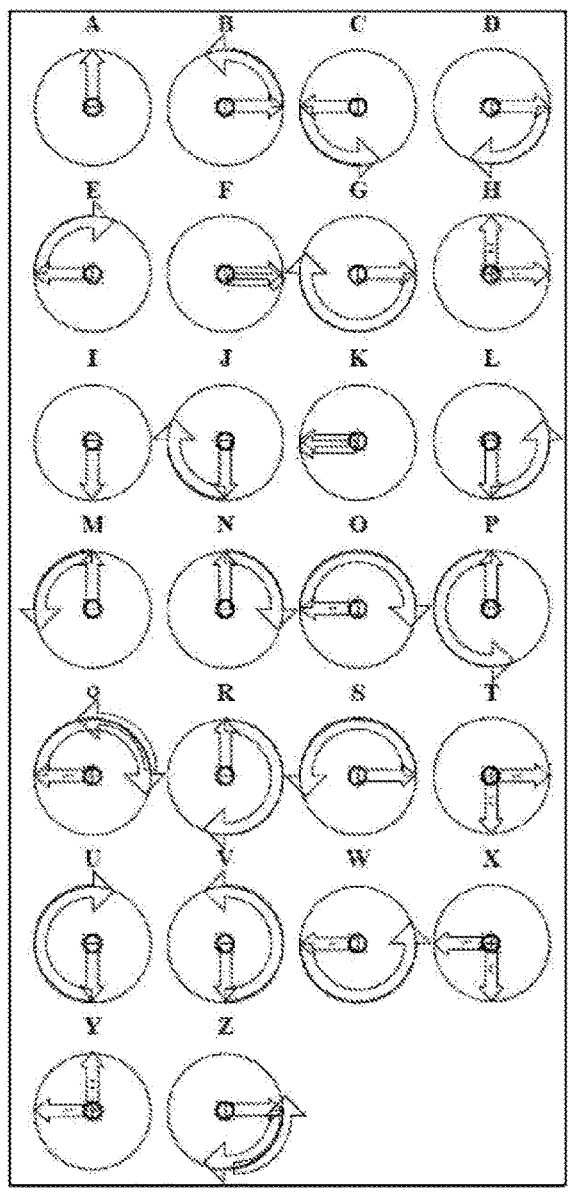
FIG. 6 shows three tables illustrating exemplary combinations of elementary movements when drawing letters, numbers and punctuation marks.
Figure 6:
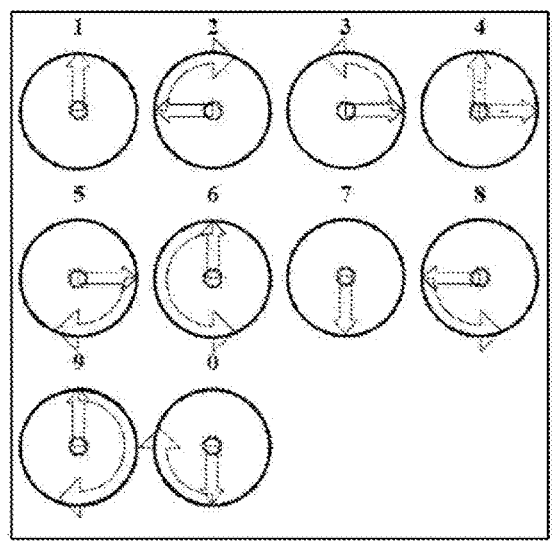
Figure 6:
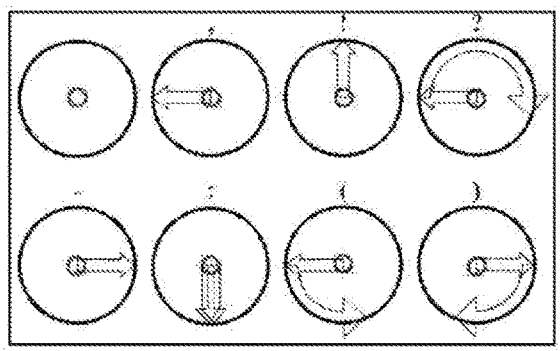

FIG. 6 shows tables a. b. and c that give examples for the elementary movement combinations how letters (table a) numbers (table b) and punctuation marks (table c) can be drawn in the English alphabet. The selection between the tables can happen in several ways. An easy way is the association of the respective isles 17-20 with a function, and if the required isle is pressed, then the gesture combination entered thereafter will mean the table selected by the given isle. Functions can be chosen in other ways, e.g. if the user will start drawing the gestures from one of the recesses 12-15 and not from the centre region 16 this can also have a meaning of a function. A further possibility for selecting a function can be the association of a single elementary radial finger movement with a function.

As fingers are sensitive to rather small movements, the data entry field 11 can be quite small, even as small as shown in FIG. 6 or smaller. This requires much smaller area than the connection of insulated fields simulating the ITU-T standard. Moving a finger in a small area is much less tiring than taking longer finger movements which was required in the cited prior solutions.

Figure 7:
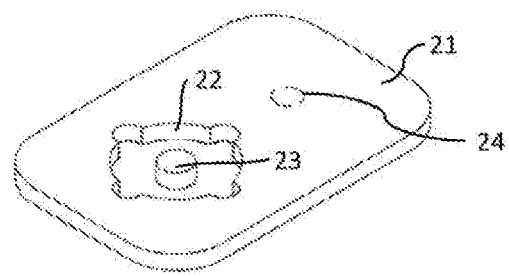
FIG. 7 is a schematic detail of a touch screen simulating a data entry filed with boundary, recesses and centre.

In FIG. 5 the data entry field was shown as being sunken from the surrounding surface of the device 1. Similarly definite tactile sensations can be obtained if the data entry field has an increased level compared to the surrounding of the device 1 as illustrated in the sketch of FIG. 7 wherein device 21 has a shape similar to the device 1 of FIG. 5 but a similar data entry field 22 is extending out of the surface and it is not sunken as in case of the FIG. 5 embodiment. It is preferred that the central region 23 is a sunken circular recess. There is no need for the isles as after some practice users can learn the directions and can determine in what radial direction they have to start movement.

To assist finding the special regions (the centre region 16 and the recesses 12-15) the body of the device 21 can be provided with a small vibrator 24 shown in FIG. 7 with dashed line as it is normally hidden in the body of the device 21. The processor that receives the electronic signals when the user touches the data entry field 22 can be programmed so that it notices when the finger reaches any one of the special regions and controls the vibrator 24 as long as the finger is in that small region. Such a vibration can render the need of physically built recesses unnecessary but it can assist even if the recesses are built and used. In a similar way the positioning of the centre region 16, 23 can also be associated with a vibration.

The principle of entering characters/functions by predetermined gesture combinations of radial and arced elementary movements can also be utilized in several different ways from those shown in the preceding examples without departing from the essence which is the entry of a character by the combination of elementary radial and arced finger movements wherein the user is given a haptic feedback on the position of his finger.

There is a rapid development in haptic technology and several solutions have been published which allow the user to "feel" one or more predetermined portions of a screen which is otherwise flat.

At http://www.fujitsu.com/global/about/resources/news/press-releases/2014/0224-01.html a technology is described that conveys texture by vibrating the touch screen display panel itself or by generating static electricity. "According to that technology ultrasonic vibrations are used to convey tactile sensations by varying the friction between the touch screen display and the user's finger. This technology enables tactile sensations—either smooth or rough, which had until now been difficult to achieve—right on the touch screen display. Users can enjoy realistic tactile sensations as they are applied to images of objects displayed on the screen". This technology was used mainly to make a picture "touchable" or to present the keys of a keyboard on the screen.

By using that technology, it is possible that a data entry field 11, 23 described earlier be not physically made on the surface of the data entry device but be provided in such a way that the centre region 16, the surrounding boundary 10 and or the special positions where the recess would be formed be substituted and represented by this technology, wherein the user can sense with his finger where these special areas are located.

It is also possible that where the user places his finger for a longer time, a centre region 16 is generated and the processor creates the boundary 10 with the data entry field 11 around it. This technology has a great advantage because when the user has finished the data entry operation, the previously provided haptic structure can be removed and the whole touch screen can be used for other purposes. On the other hand, each user has different hands and fingers and the place where he can touch the screen in a most comfortable way can vary from user to user. If the data entry field is generated around the position where the user places his finger for a longer duration on the touch screen it will be the most comfortable for him at the same time.

There are other solutions that can provide targeted haptic sensation on a screen, where the height of the screen can physically "grow out" from the surrounding surface where an appropriate electronic control is provided. At the site:

https://www.microsoft.com/en-us/research/beyond-tapping-sliding/ a report has been published where the level of the screen has become higher at programmed positions.

This technology was also introduced in a different site, where an example how a keyboard with swelling keys could be electronically provided is shown. Important to note: keyboards can be inconvenient when space is limited as described in the introductory part of the specification. The site is: http://www.tuicool.com/articles/jl7f63; and a further web address of this technology is: http://www.universaldesignstyle.com/making-touchscreens-tactile-with-tactus/.

If the data entry method suggested by the present invention is combined with this technology there will be no need to physically realize the data entry field with the closed curved boundary, the centre field and the special positions along the boundary, because these can be generated anywhere in an electronic way. In any case the data entry with the present invention is easy, requires a small space from the surface of the device, and by means of the haptic feedback the writing can be made with much less typing errors and faster than with existing data entry methods.

In the following preferred embodiments of the data entry device 1 will be shown, in which the method according to the present invention can be carried out and which provides a number of additional advantages for the user.

Figure 8:
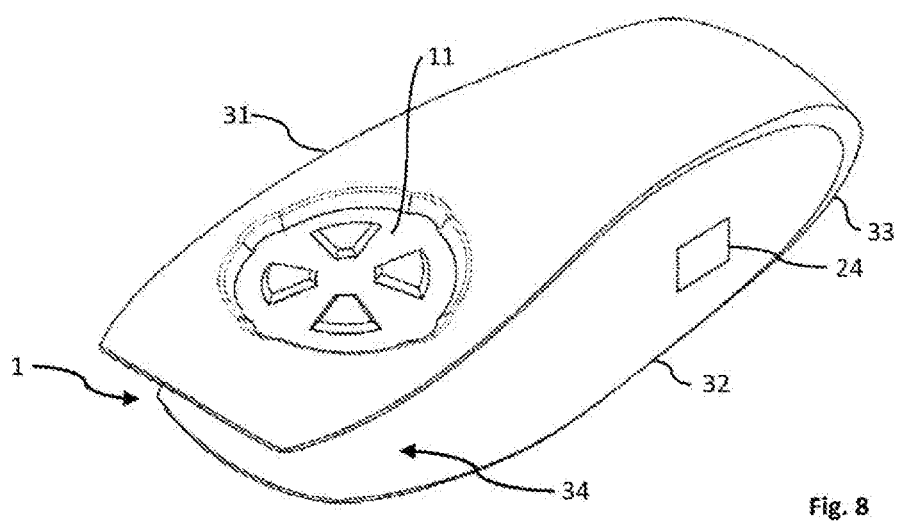
FIG. 8 shows the schematic perspective view of a preferred device 1 for data entry.
Figure 9:
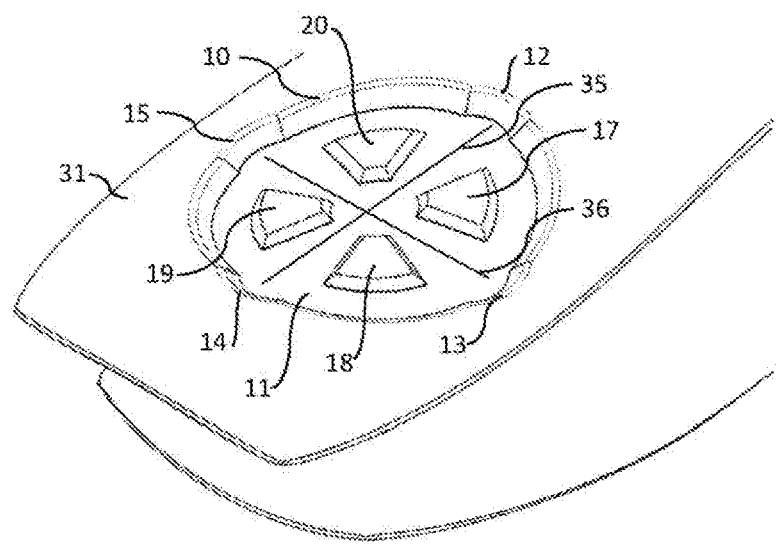
FIG. 9 is an enlarged view of a detail of FIG. 8.

In FIG. 8 a specially design of the data entry device 1 is shown, which has a curved shape that fits well in the palm of a human hand in which during use it is held. The device 1 has a curved body with respective upper and lower, i.e. first and second parts 31, 32 interconnected by an arced end portion 33. A gap 34 is formed between the outer portions of the two parts 31, 32. On the top of the first part 31, where the body has about the maximum width the data entry field 11 as shown in FIG. 5 is provided. FIG. 9 shows the enlarged perspective view of the upper part 31 with the data entry field 11 thereon. The figure shows the sunken design of the data entry field 11, from which the four isles 17 to 20 swell out. The curved boundary 10 has the four recesses 12-15. The depth of sunken data entry field 11 is small, but sufficient to enable feeling the boundary 10 by the finger. The isles 17-20 stand out from the plane of the sunken data entry field 11 and their height is somewhat below the level of the outer surface of the first part 31, but their projection is sufficient for the user to feel their presence and orientation when touching them by a finger that controls the data entry. The first diagonal 35 between the isles extends in longitudinal direction of the device 10, and the second diagonal 36 extends in transverse direction.

The data entry by using this embodiment is the same as described in the previous embodiment. When the user places one of his fingers (forefinger or thumb) on the data entry field 11, he will feel the position and location of the four isles 17 to 20, and he can thereafter move his finger in accordance with the previously learned association rules between the respective combinations of elementary movements and the data to be entered. The user can move his finger in any of the four directions along the diagonals 35, 36 in the channels formed between the isles 17-20, and when reaching the end of a diagonal is feed back to him by sensing the presence of the associated one of the four recesses 12-15. Then he can choose in which direction he wishes to move on and feels not only the boundary 10 as a guiding path, but the finger senses the channel formed between the outer edges of the isles 17-20 and the boundary 10. This feeling is more definite as if he would feel only the edge of the boundary 10, and the presence of the guiding channels assist the user in more definitely sensing where his finger moves. The movement continues along a channel portion until it arrives to the next one of the recesses 12-15. The haptic feedback provides a perfect orientation on the actual position. The presence of the vibrator 24 arranged in the body of the device further supports the haptic feedback and orientation of the user.

The device 1 in the previously described design can be used as a data entry means for a remote host device like a smart television set, a set top box or an internet television receiver unit, a remote computer, a projector or any other smart device in which data entry might be need from a remote position. The task of entering data is often combined with the need of controlling the cursor on the screen or of a function of a remote or connected host device. For such tasks the use of a mouse (wired or wireless) is the best solution.

The device 1 has the data entry field 11 on the first part 31, which is slightly longer than the second part 32. If the device 1 is turned in the hand of the user so that the previously lower second part 32 will face upward, the free upper surface obtained in this way might enable controlling and using the device 1 in a different mode, which is preferably an air mouse mode.

Figure 10:
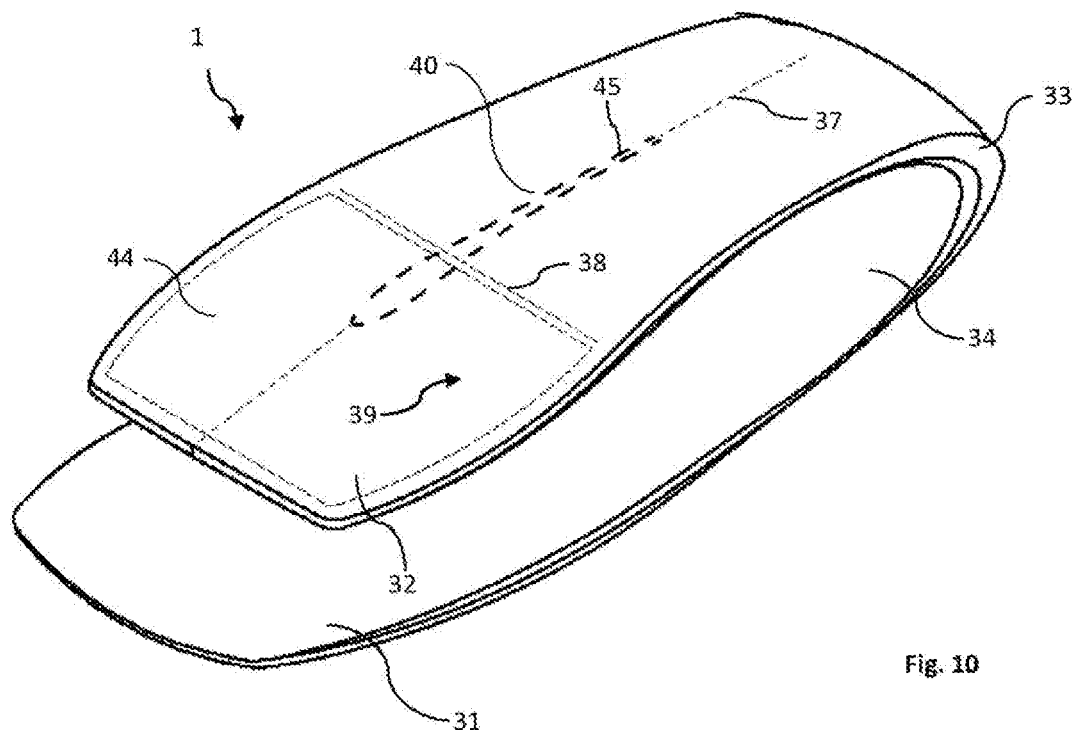
FIG. 10 shows the device 1 of FIG. 8 when turned upside down to perform an air mouse function.
Figure 11:
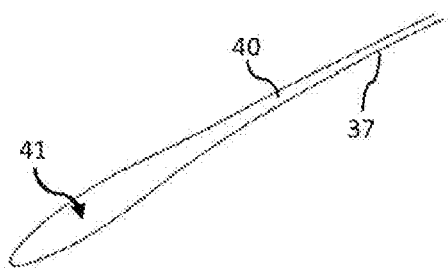
FIG. 11 shows a detail of FIG. 10 used for realizing scroll commands.
Figure 12:
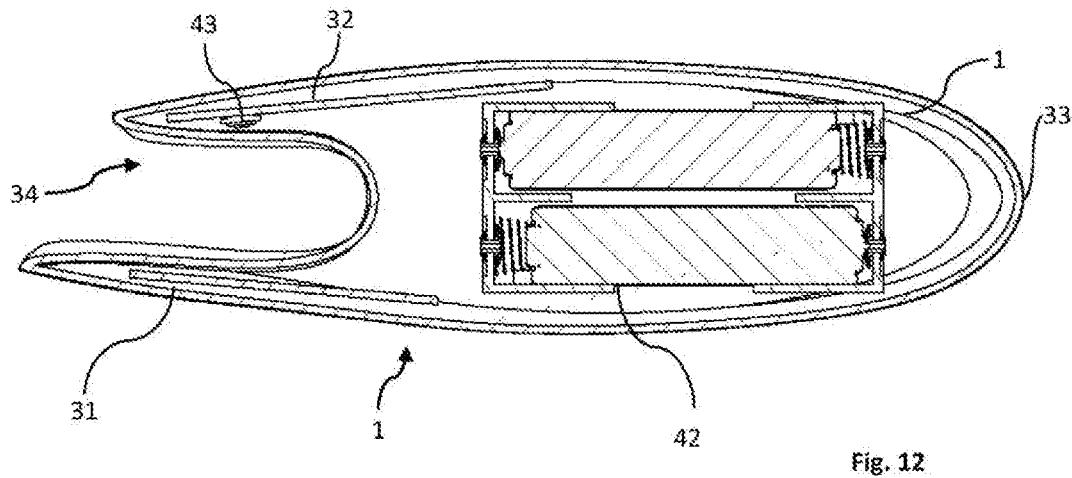
FIG. 12 shows the device for side view and in section.

FIGS. 10 to 12 show the device in this turned position. The longitudinal body of the device has a central longitudinal axis 37 on the second 32 and a curved transverse border line 38. The transverse border line 38 designates the rear limit of a manipulation area 39 within which the forefinger or the thumb of the user can comfortably rest or move and reach any portion. In a preferred embodiment along a part of the central axis 37 a recess 40 is provided, and in the enlarged sketch of FIG. 11 it can be seen that the recess 40 has a field 41 continuously widening in frontal direction. The field 41 can be used to perform a scroll function. It can be preferred if not only the width but also the depth of the recess 40 increases towards the front end of the field 41. Such a design of the recess 40 provides a kind of haptic feedback for the user when he touches the recess 40 and moves his finger along it, whereby he can sense roughly the position of his finger. It is also preferred if the bottom of the recess 40 has a coarse, roughened surface, so that the finger touching the recess 40 can feel when it is moved along it.

FIG. 12 shows the side view of the device 1 which as a curved design and also shows how the first and second parts 31, 32 fit to the rear body part 33. In the interior space of the rear body part 33 of the device 10 batteries 42 are provided to ensure the required energy for the electronic circuits of the device 1. These circuits are small in size and have not been illustrated separately.

In the inner side of the second part 32 close to the gap 34 a small sensor 43 is arranged that can be a micro switch or any other displacement sensor, which has the task of sensing when the two parts 31 and 32 are compressed. The material of the body and especially of the parts 31 and 32 has a certain kind of flexibility, and when the manipulation area 39 is pressed at any position relative to the other part supported by the palm of the user, this is followed by a slight inclination of the two compressed parts, and this displacement is sensed by the sensor 43. The turning on of the sensor 43 corresponds to a clicking with a mouse, but this clicking is not position-dependent or field-dependent as in case of most mouse designs, where clicking should be made when the finger presses a special button. The differentiation whether a clicking takes the role of a left, central or right button is controlled electronically as it will be described at a later part of the specification.

In the embodiment shown the second part 32 of the device 1 is associated with the air mouse function when it faces upward, and respective touch sensors 44, 45 are placed under the manipulation area 39 and the recess 40 to sense the position of the finger when it is placed or moved anywhere thereon. A larger single touch sensor can take the role of both sensors 44, 45 and the differentiation serves only the ease of understanding. The touch sensors 44, 45 are placed and visually hidden under the thin plastic cover sheet of the device 1 therefore they have been illustrated by dashed lines.

Figure 13:
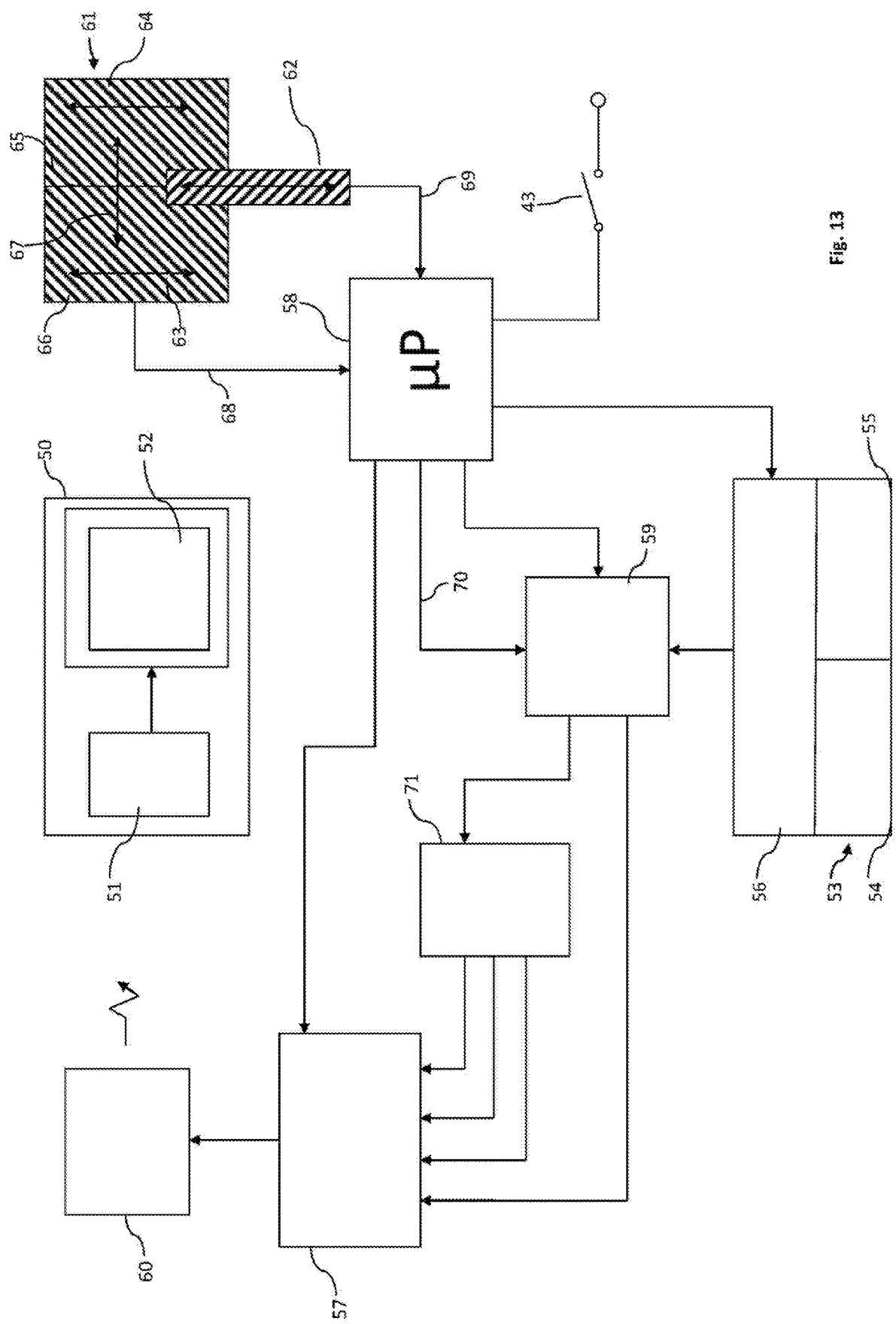
FIG. 13 shows a schematic block diagram illustrating operation in air mouse more.

FIG. 13 shows a schematic functional block diagram of the hand held device 1 when performing the function of an air mouse. The device 1 is in a wireless communication connection with a remote host device 50 that has a wireless receiver 51 and a main unit with a display screen 52 that the user watches when uses the device 1 as an air mouse. The host device 50 can be any smart unit that can receive cursor control through the receiver 51. As examples the host device 50 can be a set top box or a smart television set or a computer with internet access or a projector, etc. The device 1 has an air mouse functional unit of conventional design that includes a motion sensor 53, in which a gyroscope 54 and acceleration sensor 55 are arranged. The motion sensor 53 has a virtual deflection control unit 56. The task of the motion sensor 53 is to generate cursor control signals that follow the yaw and pitch components of the movement of the device 1. A driver 57 receives cursor control signals either from the motion sensor 53 or from a processor 58 through a control unit 59 and the driver 57 is connected to wireless transmitter 38 that is communicating with the receiver 51 of the host device 50.

Figure 14:
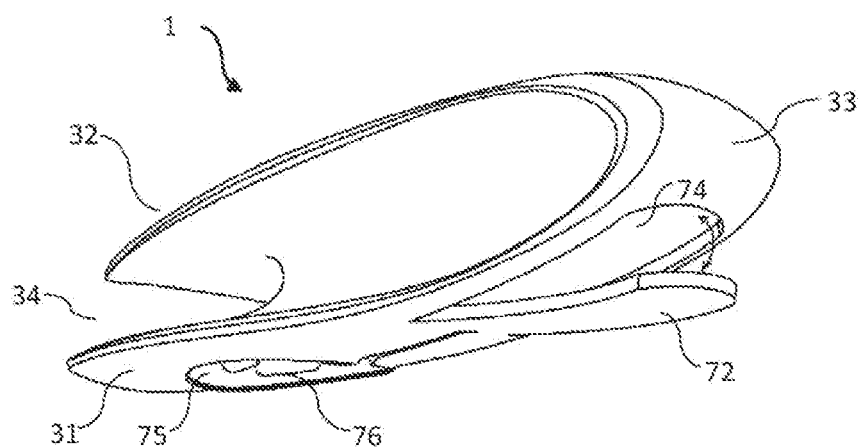
FIG. 14 is a similar perspective view of an embodiment of the device that performs additionally the function of a conventional mouse.

In this embodiment the user controls the movement of the cursor on the display screen 52 by his hand that holds the device 1 and places and/or moves his free finger on the manipulation area 39 under which the touch sensors 44, 45 are located. In FIG. 14 the manipulating area has been shown with hatched lines, and this includes main control field 61 and scroll field 36 (which corresponds to the recessed field 40 shown in FIG. 10). The main control field 61 is virtually divided into a left field 63 and a right field 64 divided preferably by the central longitudinal axis of the second part 32. This separation can be a virtual separation only, wherein distinction between the fields 63, 64 is made only by software that evaluates the position signals received from the touch sensor 44 and the user will not physically sense where the separation line extends. It is preferred if a small rib or recess 65 is formed along the central longitudinal axis 37 of the main control field 61, whereby when the finger moves along the main control field 61 the user can feel where the rib 65 extends and he will know whether his finger is on the left or right field 63 or 64.

The touch sensor 44 under the manipulation field 39 can sense and differentiate between the following events:

a. Whether a finger is in contact with the main control field 44;

b. Whether the finger contacts the left or the right field 63 or 64;

c. Whether the finger moves substantially parallel to the longitudinal axis along arrow 66;

d. Whether the finger moves so that the movement has a transverse component parallel to the transverse axis shown by arrow 67;

e. Whether the finger is at the scroll field 62 and where it contacts the scroll field 62;

f. It can also sense the direction, position and speed of the finger movements.

The signals sensed by the touch sensor under the main control field 61 are led through line 68 to the processor 58 which is preferably a programmable microprocessor, and the signals under the scroll field 62 are also coupled to the processor 58 through line 69.

The processor 58 is programmed so that it senses all of the listed events. Concerning these events the term "contact" includes both the slightest touch that can be sensed by the touch sensors and also a contact made with a predetermined threshold pressure force that can be distinguished from an accidental touch. The threshold contact pressure might have significance in providing safety of operation, or might express an intention that certain events will be triggered only if a predetermined amount of pressure is exercised by the finger. When event a. is sensed, the processor 58 activates the mouse control unit 59. This control means that when a finger contacts anywhere the main control field 61, the mouse control unit 59 is activated and as a consequence the driver 57 is turned on and the cursor control is activated. This also means when there is no finger on the main control field 61, there is no cursor control and the cursor stays at the previously set position. In this function the use of a minimum threshold contact pressure can be preferred so that the operation of the air mouse function can be turned on in response to a well distinguishable pressure.

If the finger is not moved but only touches anywhere the main control field 61, the cursor control signals of the motion sensor 53 are allowed to pass through the mouse control unit 59 and reach the control input of the driver 57, and these signals will control the cursor of the screen 52 of the host device 50, and the device 1 functions as a conventional air mouse, i.e. the cursor follows the hand movements.

When the event c. is sensed, i.e. when the finger is moved in parallel to the longitudinal axis 37, this is sensed by the processor 58 and it also determines the sense of the movement i.e. whether it is directed upward or downward. The processor 58 evaluates the direction and the speed of this longitudinal finger movement and also the distance of the momentary finger position from the initial positions, and generates a deflection control signal and this signal controls the deflection control unit 56 in such a way e.g. that a downward finger movement decreases the speed of the cursor deflection and an upward movement increases the same. The term "speed" of cursor movement is an expression that means that in response to a unity hand movement in any direction what distance the cursor will take. If the speed is high, then even slight hand movements result in speedy cursor movements, i.e. the cursor can be easily controlled to take greater distances on the screen. When the speed is low, then the same hand movement will result in only a much decreased cursor movement, and the user can easily manipulate around a smaller region on the screen to find a selected target. The cursor speed control provided in this way renders the handling of the air mouse much more comfortable, since the user can decide whether he wishes to move the cursor fast to a remote region on the screen or he wishes to target a smaller position in a small region.

Assuming that the user wishes to manipulate in a fairly small screen area or he can place his hand on a stable support and would prefer controlling the cursor by moving his finger along the main control field 61 as if it was a touch pad, i.e. he wishes to give up the air mouse function, then he has a possibility to do so. This can be done by selecting the event e. i.e. the user moves his finger also in transverse direction so that his movement has a component along the transverse arrow 67. This event will be sensed by the processor 58 and in response thereto the mouse control unit 59 gets a command to disconnect the motion sensor 53 from the driver 57. At the same time the processor 58 generates from the finger movement on the main control field 61 a touch pad control signal and transmits this signal through line 46 to the mouse control unit 59 and this passes these control signals to the driver 57. From this moment onwards the cursor will move as the finger moves on the main control field 61, and the hand movements (i.e. movement of the device 1) will not move the cursor. This "touch pad mode" will last as long as the user raises his finger from the main control field 61, and when he contacts this control field 61 again, the air mouse mode will be activated. In between the cursor remains frozen at the last position.

In case at any given cursor position the user wishes to carry out a scroll function, he has to place his finger on the scroll field 62 which is sensed by the processor 58 and will control the cursor as the finger moves up or down along the scroll field 62.

In addition to these cursor control modes the conventional clicking function is also available. When the user compresses the device 1 slightly i.e. clicks, the displacement sensor 43 connected to the processor 58 is activated. This activation is interpreted as a left mouse button click if the finger is anywhere on the left field 63 and as a right mouse button click if the finger is anywhere on the right field 64. A central mouse button click is interpreted if the "clicking" occurs when the finger is on the scroll field 62. The distinction between these three possibilities is controlled by the control unit 59 upon control from the processor 58 so that a click selector 71 is set in one of the three positions, which positions control respective mouse inputs of the driver 57 that generates standard left-, right- and central mouse button click signals towards the transmitter 60. In order to provide a haptic feedback concerning the operation of the sensor 43 when the device 1 has been compressed, the small vibrator 24 (see FIG. 7) can be operated for a moment when the sensor 43 has sensed a compression. In this way the slight vibration indicates for the user that the clicking was successful.

In the described way the user has a freedom to control the movement of the cursor fast or in a slower way and to give up the air mouse mode and use his finger to make fine adjustments.

Important to note that the placement of the device 1 on a stationary support is not required in either one of the described modes, and the user is not bound to watch the screen of the air mouse, which need not exist at all. The device 1 can be equipped with a screen if required for other functions that need a separate screen.

At the same time the device 1 fits comfortably in the hand of the user, and its handling by a finger is very comfortable and not at all tiring.

It should be understood that the blocks described and illustrated in FIG. 14 represent only the main functional units of the air mouse mode of the device 1, and almost all blocks can be realized in a software route by an appropriately programmed micro controller.

Figure 15:
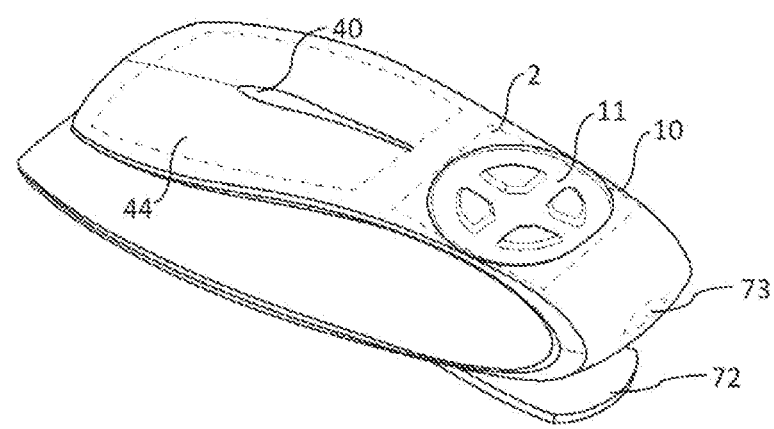
FIG. 15 shows the perspective view of the device of FIG. 14 in an upside down position.
Figure 16:
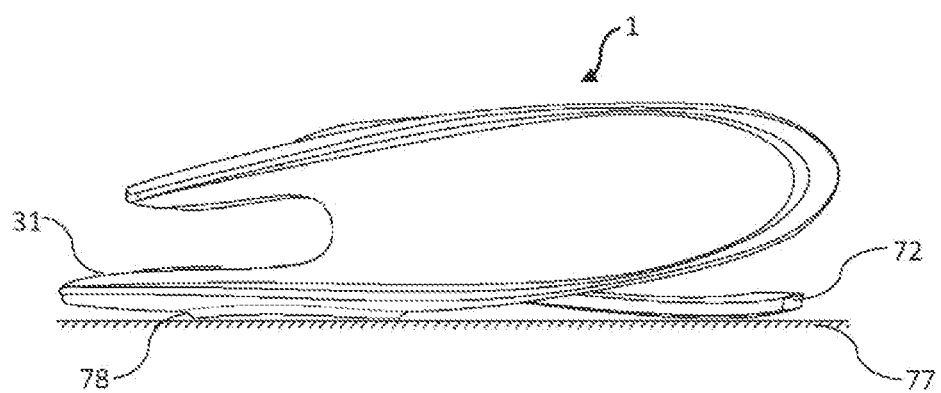
FIG. 16 shows the side view of the device of FIGS. 14 and 15.

Reference is made now to FIGS. 14 to 16 in which a further embodiment of the present invention has been shown. Up to the present two different main functions of the hand held device 1 have been shown, according to which it was used as a data entry device and as an improved air mouse and. If one wishes to reduce the number of accessories that are normally required for the handling of modern computers or smart devices, then one cannot forget about the conventional mouse function. In this embodiment an example is shown how the previously described two main functions (or any of the two) can be combined with a conventional mouse, preferably an optical mouse.

This device 1 has substantially the same curved shape as shown in the previous embodiments, i.e. it has a slightly rounded shape that fits well in the palm of the user, and has the curved rear body part 33 and the first and second front parts 31, 32 defining the gap 34 between them. In this embodiment a slightly curved support plate 72 is provided at the lower region of the rear body part 33 which has two stable positions, namely a closed position when its presence cannot be felt, i.e. its outer surface follows the outer surface of the rear body part 33 as shown e.g. in FIG. 12, and an open position as shown in FIGS. 14 to 16. The support plate 72 has a hidden hinge (not shown) that enables its opening and closing, but provides a sufficient resistance against closing. It can be preferred if a sunken lock 73 is provided that prevents closure of the support plate 72 until it is moved to an unlocked position when the support plate 72 can be returned to its original position i.e. in a recess 74.

At an appropriate region of the lower face of the first part 31 a mouse window 75 is provided, through which the light of a conventional optical mouse circuit 76 can pass to "see" a stable surface of a mouse pad 77 placed on a table (FIG. 16).

The hinged support plate 72 should have a slightly convex outer surface as the streamlined, curved basic shape of the device 1 cannot be supported or moved in a stable way of a plane surface of the mouse pad 77. In FIG. 16 it can be seen that the first front part 31 has a slightly inclined fringe 78 around the edge of the mouse window 75, and this fringe 78 and the curved lower surface of the open support plate 72 provide together a definite slidable support for the device 1.

The processor 58 can sense when the support plate 72 is moved into open position and then disables the air mouse function and enables the conventional mouse function through the wireless connection between the device 1 and the remote host device.

In the embodiment using the conventional mouse function the previously described air mouse control function and the data entry function can both be provided so that the touch sensor 44 and optionally the recess 40 providing the scroll function can be at the front region of the second front part 32 as illustrated in FIG. 15 and the touch sensitive zone 2 with the data entry field 11 with the boundary 10 around it can be arranged at the rear part of the same surface of the device 1. In conventional mouse function mode the previously described clicking and scroll functions can be equally used, as then the touch sensor 44 is located at the area which can be conveniently handled by the finger of the user. If the data entry mode is chosen, the device 1 can be turned by 180° around a virtual vertical axis, and then the data entry touch field 11 will take the comfortable front position, and the rear body part 33 will be the front end.

The data entry device according to the invention can be realized in several forms, sizes other than shown in the exemplary embodiments and can be equipped with different electronic circuitry.

From the foregoing examples it can be understood that the main function, i.e. the date entry mode takes such a small space that in the same ergonomically designed body of the device circuits and components required for further functions can be arranged, whereby the device can replace a number of gadgets which would be otherwise required for the convenient handling of smart devices.

The invention claimed is:

1. A data entry device for a user to enter predetermined characters using by a finger of a user and converting the entered predetermined characters into a sequence of electronic signals, comprising:
    a touch sensitive zone on an outer surface of said data entry device that is positioned to be touched by the finger of the user grasping said data entry device,
    a processor coupled to said touch sensitive zone for sensing when the touch sensitive zone is touched with a gesture and interpreting the electronic signals generated by the touch sensitive zone in response to said gesture, the processor being programmed to recognize predetermined abstract movements and predetermined combinations of said abstract movements on said touch sensitive zone, wherein an entry of said abstract movements has a definite beginning and ending, and the processor recognizes a character associated with combination of said abstract movements and to deliver electronic signals associated with the recognized character,
    a curved closed boundary surrounding an interior area is defined above a portion of the touch sensitive zone, said closed boundary has at least one haptic property, whereby the finger can definitely sense when said closed boundary is touched,
    a plurality of haptically recognizable spaced discrete positions are defined along said closed boundary, wherein the finger moving along said closed boundary can sense by touching when the finger is at one of said discrete positions, said interior area constituting a data entry field, said data entry field has a center region which has at least one haptic property differing from the haptic properties of a portion of the data entry field beyond and around the center region, whereby the finger when touching the center region can sense said differing haptic property, and wherein the processor recognizes when the center region is touched for a predetermined duration by the finger and interprets this event as said beginning of the entry of a character and from that moment starts monitoring and analyzing subsequent combination of said finger movements as long as the finger remains in contact with the data entry field, and determines when the finger has been raised from said data entry field to signal said end of the entry of the character,
    wherein the abstract movements on said data entry field is radial movements along paths defined between the center and one of a plurality of said predetermined haptically recognizable discrete positions on the boundary in any direction and a path of arced movements along said closed boundary from said one discrete position to a directly neighboring discrete position, and said data entry field has a unitary, non-segmented touch surface along all of said paths of said possible combination of said elementary finger movements,
    wherein respective isles with differing height are provided around the center region which isles are separated from each other by respective channels and have respective outer ends, and each of said channels extending from the center region to an associated one of said discrete positions on said closed boundary, and a further channel is provided that surrounds said outer ends of said isles and separates said outer ends from said closed boundary, wherein the center region can be sensed as being a middle zone between the isles, and the abstract movements can take place along said channels including said further channel, and said channels and the further channels constitute together said unitary non-segmented touch surface.

2. The device as claimed in claim 1, wherein said differing haptic property is height/depth of said closed boundary and/or the center region and/or of the discrete positions.

3. The device as claimed in claim 1, wherein said differing haptic property is an electrical or mechanical excitation of said closed boundary and/or the center region and/or of the discrete positions.

4. The device as claimed in claim 1, wherein at said discrete positions respective curved recesses are made in said closed boundary.

5. The device as claimed in claim 1, wherein said device has an elongated design that fits in a palm of the user and has a first and a second part connected at one end by a curved end portion and in their frontal region the first and second parts are separated by a gap, and the data entry field is provided on the outer surface of one of the parts at a location which is easily accessible by the finger of a hand holding the device.

6. The device as claimed in claim 1, wherein certain simple movement combinations or even respective single abstract movements are associated with selecting a function that changes a mode of association between the interpretation of said association of said abstract movement combination between letters to number or to punctuation marks or letters with low or upper case.

7. The device as claimed in claim 1, wherein said isles have respective associated functions activated by pressing their respective surfaces.

* * * * *